United States Patent
Verraes et al.

(10) Patent No.: US 11,421,098 B2
(45) Date of Patent: Aug. 23, 2022

(54) USE OF A DEPLETED EPOXIDIZED FATTY ACID ESTER MIXTURE AS PLASTICIZER IN HALOGENATED RESINS

(71) Applicant: Proviron Holding N.V., Hemiksem (BE)

(72) Inventors: Arnaud Verraes, Hemiksem (BE); Jelle Cornelus, Hemiksem (BE)

(73) Assignee: Proviron Holding N.V., Hemiksem (BE)

( * ) Notice: Subject to any disclaimer, the term of this patent is extended or adjusted under 35 U.S.C. 154(b) by 0 days.

(21) Appl. No.: 17/057,437

(22) PCT Filed: May 22, 2019

(86) PCT No.: PCT/EP2019/025152
§ 371 (c)(1),
(2) Date: Nov. 20, 2020

(87) PCT Pub. No.: WO2019/223902
PCT Pub. Date: Nov. 28, 2019

(65) Prior Publication Data
US 2021/0395485 A1 Dec. 23, 2021

(30) Foreign Application Priority Data
May 22, 2018 (BE) .................................. 2018/0063

(51) Int. Cl.
*C08K 5/1515* (2006.01)
*C08K 5/12* (2006.01)
*C11C 3/10* (2006.01)

(52) U.S. Cl.
CPC .............. *C08K 5/1515* (2013.01); *C08K 5/12* (2013.01); *C11C 3/10* (2013.01)

(58) Field of Classification Search
CPC ................................ C08K 5/1515; C11C 3/10
See application file for complete search history.

(56) References Cited

U.S. PATENT DOCUMENTS

2002/0013396 A1 1/2002 Benecke et al.
2012/0289727 A1 11/2012 Cordeiro et al.

OTHER PUBLICATIONS

Databook of Plasticizers (Anna Wypych, Elsevier, Jan. 12, 2017) (Year: 2017).*
International Preliminary Report on Patentability, dated Dec. 3, 2020, from International Application No. PCT/EP2019/025152, filed on May 22, 2019. 7 pages.
International Search Report of the International Searching Authority, dated Jul. 4, 2019, from International Application No. PCT/EP2019/025152, filed on May 22, 2019. 3 pages.
Written Opinion of the International Searching Authority, dated Jul. 4, 2019, from International Application No. PCT/EP2019/025152, filed on May 22, 2019. 5 pages.

* cited by examiner

Primary Examiner — Wenwen Cai
(74) Attorney, Agent, or Firm — HoustonHogle LLP (57) ABSTRACT

The present invention relates to the use of a depleted epoxidized fatty acid ester mixture as plasticizer in a halogenated resin composition, said ester being obtainable by a process comprising epoxidation of a vegetable oil, transesterification of the epoxidized vegetable oil, short path distillation of the trans-esterified epoxidized vegetable oil and selection of the non-vaporized fraction of the preceding process step. The depleted ester mixture is suitable for being incorporated in halogenated resin compositions at a ratio exceeding 40 phr, without causing rheological or other problems to occur under practical industrial applications for the plasticized resin composition.

11 Claims, 5 Drawing Sheets

USE OF A DEPLETED EPOXIDIZED FATTY ACID ESTER MIXTURE AS PLASTICIZER IN HALOGENATED RESINS

RELATED APPLICATIONS

This application is a § 371 National Phase Application of International Application No. PCT/EP2019/025152, filed on May 22, 2019, now International Publication No. WO 2019/223902 A1, published on Nov. 28, 2019, which International Application claims priority to Belgian Application No. 2018/0063 filed on May 22, 2018, both of which are incorporated herein by reference in their entirety.

FIELD OF THE INVENTION

The present invention relates to a new composition that can be used as plasticizer in polymer resins, in particular, polymer resins based on or containing polyvinylchloride. More in particular, the invention relates to a plasticizer comprising a distilled or purified epoxidized fatty acid ester derived from a vegetable oil.

Such a plasticizer has quite specific properties with respect to the compatibility with the polymer resin. Furthermore, such a plasticizer is of at least partially bio-based or renewable origin. In this way, this invention helps to enhance the ecological durability of the final application.

BACKGROUND OF THE INVENTION

Plasticisers are used in various polymers to enhance their flexibility, and thereby transforming rigid material into flexible ones. By virtue thereof the possibilities and applications of these polymers are substantially enhanced. Plasticisers are used in various polymers, among which the most important are: polyvinylchloride, polyamide, polar rubbers and polyurethane.

Plasticizers are commonly incorporated into polyvinylchloride (PVC). PVC is a technically and economically very important polymer and is compounded in soft and rigid formulations for a large number of applications. Soft PVC compounds are obtained through combination of plasticisers and PVC resins. Important applications include amongst others cable jacketing, floor covering materials, various coating applications and shoe soles.

Plasticisers usually are liquids that can be used in various technical processes. The physical characteristics of the plasticizers determine their scope of utilization. In particular the solubility parameters of a plasticiser have to match with the solubility parameters of the polymer to provide efficiency and to prevent exudation.

Plasticisers for PVC are usually phthalic anhydride esters (phthalates). Still today about 80% of the worldwide plasticizers consumption for PVC are related to phtalate compounds. These plasticizers provide enhanced flexibility for a large number of applications. During PVC gelation, the plasticiser molecules solvate amorphous parts of the PVC macromolecules. "Gelation" is a usual term to describe the physical phenomenon occurring when polymer macromolecules entangle and form a continuous material. Since these plasticizers are positioned in-between polymer chains and since they hold fatty chains, they avoid intermolecular bonding between PVC macromolecules and enhance the mobility of the PVC polymeric chains. Subsequently, PVC glass transition temperature is lowered. Plasticizers have the ability to couple substantially improved process properties to a high flexibility of the end product. The working principle of the above plasticizers relate to the so-called external plasticizers. These are products that additionally are added to polymers during their formulation and/or their transformation; the plasticising effect is the result of a physical interaction with the polymer molecules, as described above.

There also exist internal plasticisers. These are polymeric material blended with PVC during compounding and by virtue thereof provide mechanical flexibility to the end-product. The present invention only relates to so-called external plasticisers.

Absent any covalent or ionic bonding between plasticizers and polymers, exudation and/or volatilization is likely to occur. Besides compatibility and gelation speed, another critical property of plasticizers is its ability to remain in the polymeric matrix at its initial site of incorporation. The term "permanence" refers to this ability.

For PVC plasticization, phthalate plasticizers are quite commonly used. However, nowadays this class of chemicals is questioned due to potential health impact; they are believed to act as endocrine disruptor. Hence, public concern against their use is growing. As a response to this growing concern, the PVC industry developed new plasticizers to remedy this problem. The two main phthalate-free solutions are hydrogenated DINP (di-isononyl-cyclohexane-1,2-dicarboxylate) and DOTP (di-octyl-terephthalate).

Hydrogenated DINP is known to deliver slow gelation (in other words, low productivity).

DOTP and hydrogenated DINP are known to exhibit exudation issues under particular circumstances, as will be described hereinafter.

The issue of exudation arises as a result of the difference in solubility parameter between polymer and plasticizer. The compatibility between a polymer and a plasticizer can be quantified by the maximum amount at which a given plasticizer can be incorporated within a specific polymer, without causing a higher exudation than compared with usual plasticizers.

As for DOTP and hydrogenated DINP, these two compounds do not cause particular exudation issues as long as their rate of incorporation in the polymer to be plasticized is situated below 40 phr (weight parts of plasticizer per hundred weight parts of resin). However, for some applications, the amount of plasticizer in the resin to be plasticized should exceed this critical limit of 40 phr.

Usually, hydrogenated DINP and DOTP are mixed with so-called "fast fusers". Fast-fusers" are characterized by a fast gelation speed and a high compatibility with PVC. "Fast-fusers" prevent the occurrence of exudation issues by limiting the amount of general-purpose plasticizer.

US patent application 2002/0013396 A1, published on Jan. 31, 2002, application number U.S. Ser. No. 09/849,071 filed May 4, 2001, discloses plasticizers derived from vegetable oils.

The sequence of process steps disclosed in this specification is as follows:
(1) Transesterification;
(2) Distillation;
(3) Use of the non-vaporized fraction;
(4) Epoxidation.

SUMMARY OF THE INVENTION

The purpose of the present invention is to overcome the limitations relating to the incorporation of plasticizers, in particular hydrogenated DINP and DOTP, in polymers to be plasticized such as PVC.

Another object of the present invention is to provide a plasticizer composition that can be incorporated in PVC-type resins at a rate above 40 phr, without noticeable exudation issues to occur.

The present applicant has devised and embodied this invention to meet the abovementioned objects, to overcome the abovementioned shortcomings and to obtain further advantages.

More in particular, to this end, the inventors have developed a plasticizer composition for use either as a stand-alone plasticizer, or in combination with traditional phtalate-free plasticizers, and whereby the drawbacks of such traditional phthalate-free plasticizers such as hydrogenated DINP and DOTP do not arise or are sufficiently compensated. On top hereof such new and inventive plasticizer composition is characterized by the presence of additional and unexpected properties as will be apparent from the description that follows.

These objects and advantages are given only by way of illustrative example, and such objects may be exemplary of one or more embodiments of the invention. Other desirable objectives and advantages inherently achieved by the disclosed invention may occur or become apparent to those skilled in the art.

STATEMENT OF INVENTION

The present inventors have conducted extensive studies in order to solve the above-mentioned problems. As a result, they have successfully found that an excellent plasticizing effect can be obtained even at higher degrees of incorporation of a plasticizer or a plasticizer blend into a polymer matrix, in particular PVC, by using the plasticizer composition of the present invention.

The invention is defined and characterized in the main claim, while the dependent claims describe other characteristics and specific features for preferred embodiments of the invention.

The invention also relates to a plasticizer consisting of or comprising a depleted epoxidized fatty acid ester mixture as set forth in the claims or description, as well as a plastisol or halogenated resin composition comprising such plasticizer.

Further aspects and advantages of the embodiments of the invention will appear from the following description taken together with the accompanying figures.

DETAILED DESCRIPTION OF EMBODIMENTS OF THE INVENTION

The following is a detailed description of the preferred embodiments of the invention.

It will be appreciated that for simplicity and clarity of illustration, where considered appropriate, numerous specific details are set forth in order to provide a thorough understanding of the exemplary embodiments described herein. The present invention now is described more fully hereinafter. However, it will be understood by those of ordinary skill in the art that the embodiments described herein may be practiced without these specific details. Indeed, this invention may be embodied in many different forms and should not be construed as limited to the embodiments set forth herein; rather, these embodiments are provided so that this disclosure will be thorough and complete, and will fully convey the scope of the invention to those skilled in the art.

In other instances, well-known methods, procedures and components have not been described in detail so as not to obscure the embodiments described herein.

Plasticizer According to the Invention, Preparation Method.

According to one aspect of the invention, there are provided bio-based compounds that can be used as plasticizer in halogenated polymers, said bio-based compounds comprising or consisting of a depleted epoxidized fatty acid ester mixture that is essentially free of volatile esters and essentially free of non-functionalized esters (or non-epoxidized esters). These compounds will be referred to hereinafter as DEP (Depleted Epoxydized Plasticizers). The term "Depleted" refers to the inherent characteristic of these plasticizers as being "relatively free" of non-functionalized esters.

Such depletion can be obtained by subjecting a vegetable oil to the process described hereinafter including selecting the non-vaporized fraction resulting from this process and using this fraction as plasticizer.

According to a further aspect of the invention, there are provided such epoxidized mono-esters that are essentially free of non-functionalized fatty acid esters.

According to a preferred mode of the invention, the bio-based compounds comprising or consisting of a depleted epoxidized fatty acid ester mixture, preferably a mono-ester mixture, is characterized in that the weight amount of non-functionalized esters is less than 5%.

The process for preparing such depleted epoxidized fatty acid (mono-)esters comprises in the order given:
  1) epoxidation of a vegetable oil, followed by
  2) transesterification of the epoxidized vegetable oil, followed by
  3) short path distillation of the trans-esterified epoxidized vegetable oil, followed by
  4) selection of the non-vaporized fraction of process step 3) as depleted epoxidized fatty acid ester mixture.

The main advantage of the short path distillation step is the reduction of the amount and/or the proportion of non-functionalized or non-epoxidized fatty acid esters in the residue or non-vaporized fraction resulting from this process step.

The inherent advantage hereof is that the non-vaporized fraction yielding the depleted epoxidized fatty acid ester is particularly suitable as plasticizer in halogenated polymers.

According to a further aspect of the invention, the process is characterized in that the epoxidized vegetable oil is trans-esterified by 2-ethylhexanol, isoamyl alcohol or isononyl alcohol.

The invention relates to the use as plasticizers of the mixtures of the depleted epoxidized fatty acid esters obtained by the process as set forth above.

The plasticizer composition according to the present invention in particular is suitable for being used in one or more polymers selected from the group consisting of halogenated polymers (such as polyvinyl chloride, a copolymer of vinyl chloride with vinyl acetate or with butyl acrylate), polyalkyl methacrylate, polyvinyl butyral, polyurethane, polylactic acid, polyhydroxybutyral and nitrocellulose.

Contrary to the sequence of process steps disclosed in US patent application published as US 2002/013396 A1, the depleted epoxidized fatty acid ester mixture used as plasticizer in the present invention has been produced by a process following a quite different sequence of process steps. In the present case, the order of reaction steps has been reversed in the sense that the epoxidation step precedes the distillation step. This yields the unexpected and substantive advantage that resulting from a substantially enhanced molecular weight following the epoxidation step, the subsequent distillation step is performed in a substantially more efficient manner, resp. gives rise to a substantially enhanced purified or depleted product. Indeed, by performing the epoxidation step as the initial step of the sequence of process steps, by the addition of at least one oxygen atom to the fatty acid moiety resulting from such epoxidation, the molecular weight of the epoxidized compound enhances as compared to the non-functionalized, i.e. non-epoxidized compounds in the reaction mixture. This increase in molecular weight of the epoxidized compounds, to be retained as the desired residue product, facilitates the distillation on the one hand and on the other hand results in a depleted epoxidized fatty acid ester mixture with improved properties as compared to presently known state-of-the-art plasticizers as will be shown hereinafter.

Detailed Description of the Preparation Process for Producing the Plasticizer

The following is a detailed description of the preparation method for producing the plasticizer used according to the invention.

Epoxidation:

Epoxidation is the process of adding an oxygen atom across a carbon-carbon double bond to create epoxide (or oxirane) functionality. Epoxidation reactions are typically performed with percarboxylic acids or other peroxy compounds.

Epoxidation is performed to enhance the compatibility of the epoxidized compounds with PVC. Upon epoxidation, compounds become compatible with PVC as their long chain fatty acid groups are epoxidized.

Apart from the enhanced compatibility, the epoxide functionality in epoxidized vegetable-oil based plasticizers also significantly contributes to the thermal stability of the PVC matrix.

As examples of epoxidized vegetable oils, epoxidized soybean oil (ESBO) and epoxidized linseed oil (ELSO) can be used in the present invention.

As to the desired or required degree of epoxidation of the compounds to be used as plasticizers according to the present invention, both the iodine value and the oxirane value of the vegetable oil are of interest.

The iodine value of a product is a measure for the amount of double bonds present in that product and is expressed as g I2/100 g of product. Thus, a high iodine value corresponds to a high amount of double bonds present.

The oxirane value of a product is a measure for the content of epoxides present in that product and is expressed as weight % oxygen originating from epoxides. Thus, a high oxirane value corresponds to a high content of epoxides being present, e.g. 6.5% oxirane value corresponds with 6.5 g of oxygen originating from epoxides per 100 g of product.

Soybean oil has typically an iodine value of 120-140 g I2/100 g.

After epoxidation, the iodine value should be below 5 g I2/100 g, and preferably below 2.5 g I2/100 g and the oxirane value should be greater than 6.3% and preferably above 6.5%.

Linseed oil has typically an iodine value of 155-205 g I2/100 g. After epoxidation, the iodine value should be below 7 g I2/100 g and the oxirane value should be greater than 8.5%.

Transesterification Step:

Regarding the transesterification step comprised in the sequence of process steps for producing the plasticizer: by transesterification is meant the reaction of an ester with an alcohol to produce a derived ester and the alcohol in the original ester. Such reactions, as most chemical processes, are equilibrium reactions and are generally driven to completion by removal of the product alcohol, such as by distillation, provided the alcohol is the lowest boiling compound.

The reaction set forth below shows the transesterification process:

According to the transesterification reaction scheme set forth hereinafter, ESBO (Epoxidized Soy Bean Oil) is trans-esterified by 2-ethylhexanol to glycerol on the one hand and a functionalized fatty acid ester on the other hand (epoxidized 2-ethylhexyl soyate, as explained hereinafter).

R = fatty acid moiety

Alternatively, In the transesterification reaction scheme set forth hereinafter, ESBO is trans-esterified by isoamyl alcohol to glycerol on the one hand and a functionalized fatty acid ester on the other hand (epoxidized isoamyl soyate, as explained hereinafter).

R = fatty acid moiety

The term iso-amyl alcohol as used in the present specification and the claims, refers to either 3-methylbutanol, or while bio-based iso-amyl alcohol is used, refers to a mixture of 3-methylbutanol and 2-methylbutanol, the latter compounds being present according to a preferred embodiment of the present invention in a ratio of approximately 80/20% by weight.

In both of the above transesterification reaction schemes, contrary to the presently known trans-esterification processes using a sodium methylate as catalyst, the alkali alkoxide of the corresponding alcohol is used as transesterification catalyst, more in particular potassium or sodium alkoxide.

Such a product, the alkali isoamyl alcoholate, more in particular potassium or sodium isoamyl alcoholate, has e.g. been described in the US patent application published under the number US 2012/0289727 A1 in the name of NPC Industrias Quimicas AS LTDA.

A suitable production mode for such catalyst is described hereinafter.

In principle, three reaction or synthesis routes are possible for the alkoxide catalyst:

1) Reaction of an alcohol, in particular isoamyl alcohol or 2-ethylhexanol, with the alkali metal such as (metallic) sodium, followed by removal of the hydrogen;

2) Reaction of an alcohol, in particular isoamylalcohol or 2-ethylhexanol, with an alkali hydroxide such as sodium hydroxide, followed by removal of water;

3) Exchange reaction (transalkoxylation) of an alcohol, in particular isoamyl alcohol or 2-ethylhexanol, with another alkoxide, followed by removal of methanol.

In case the third synthesis route is used, as a starting material, an alkali methoxide such as sodium methoxide (also called sodium methylate) can be used given its industrial availability. It can be used either in powder form or as a solution in methanol. The solution is the preferred mode, given the difficulty in handling the powder form.

The transesterification scheme by means of the catalyst is shown hereinafter:

The reaction with a sodium alkoxide as catalyst comprises two consecutive steps.

Step 1:

In the second step, the alkoxide catalyst is regenerated by reaction with the excess of alcohol HO—$R_2$, this being also an equilibrium reaction.

Step 2:

Short-Path Distillation:

The present application uses the term "short-path distillation" as it is conventionally used and understood by those practiced in the art of distilling chemical compositions. Within the framework of the invention, the term "short-path distillation" specifically is directed to single stage short-path distillation, as will be described hereinafter.

Short-path distillation is a distillation technique that involves the distillate travelling over a short distance, and is usually performed at reduced pressure.

The advantage of the reduced pressure is that the heating temperature can be held at a considerably lower level than the boiling point of the liquid to be processed at standard, e.g. atmospheric pressure. Further, the distillate in the apparatus wherein the short path distillation is performed, only has to travel over a short distance before condensing.

Figure 5:
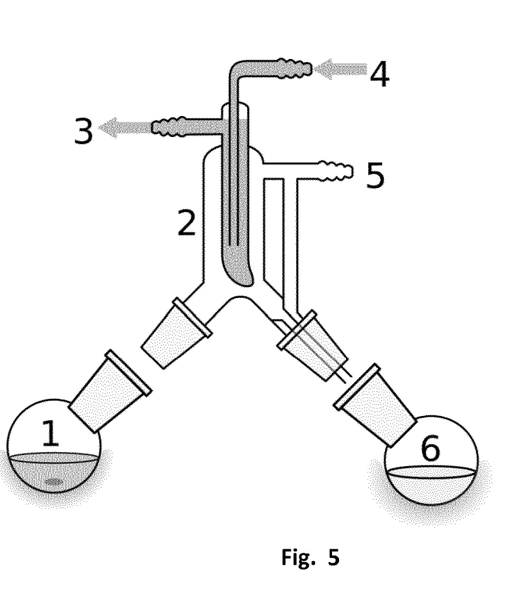
FIG. 5 is an example of an apparatus for performing short path distillation.

An example of a kind of apparatus that can be used for performing the short path distillation is a "Kugelrohr", comprising e.g. two glass chambers, separated by a vertical condenser fraction.

An example of such apparatus is shown in FIG. 5.

In said figure, the following reference signs are used:
1. denotes the still pot with stirrer, comprising the composition to be distilled, hereinafter called the evaporator pot or bulb;
2. denotes the cold finger, bent to direct the distillate;
3. denotes the cooling liquid outlet;
4. denotes the cooling liquid inlet;
5. denotes the vacuum connection;
6. denotes the container for storing the distillate, hereinafter called the distillate pot or bulb.

As a cooling liquid, water can be used.

The short path distillation technique splits the starting product in two fractions, a distilled or vaporized fraction, hereinafter referred to as the distillate, and a non-vaporized fraction, comprising the heavier compounds that have not been distilled over to the distillate.

This non-vaporized or distilled fraction is hereinafter often referred to as "residue". The reduction of non-functionalized or non-epoxidized compounds in the mixture to be prepared according to the present invention is effected by selecting such non-vaporized fraction or "residue" as the final or desired product.

The distillate fraction is to be regarded as a waste or by-product.

Prior to performing the short-path distillation step, the starting product may be de-gassed and/or its water content reduced.

Short path distillation apparatus suitable for performing the process for producing the plasticizer of the invention are e.g. the Short Path Distillators available from UIC GmbH, a member of the BDI Group (BioEnergy International AG), Am Neuen Berg 4, 63755 Alzenau-Horstein, Germany.

Standard Glass Short Path Distillators are marketed by said company under the trade names KDL 1, KDL 5, KDL 10 and KDL 30. Any of these laboratory plants are suitable for performing the short path distillation process provided the operating parameters of the process are optimized so as to achieve the objects of the present invention. As to operating parameters for the short path distillation, amount of vacuum, evaporator temperature and feed rate are key characteristics.

The lower the vacuum, the lower the temperature in the evaporator can be held, still to have an efficient distillation process. At atmospheric pressure, the boiling point of the soyate liquid compositions exceeds 300° C. Keeping the compositions at that temperature would quickly lead to an irreversible degradation of the mixture.

So, distillation under appropriate vacuum conditions is a prerequisite so as to attain the objects of the present invention.

The feed rate should be chosen such that the short path distillation apparatus is able to process the volume of liquid in the evaporator pot in an efficient manner, this means avoiding a too high residence time of the liquid in the evaporator pot.

The temperature in the condenser can be chosen within broad limits, as long as it allows an efficient condensation of the distillate.

In the short path distillation process, the pressure preferably is kept below 0.5 mbara, preferably below 0.1 mbara. (mbara stands for millibar absolute)

Further, In the short path distillation process, the temperature in the evaporator pot of the short path distillation process and apparatus should be kept in the range of 120-200° C., preferably in the range of 120-180° C., most preferably in the range of 120-160° C.

The temperature in the condenser is less critical; it suffices to keep same within a range whereby the distillate condenses.

For the composition to be distilled according to the present invention, the condenser temperature may be kept e.g. within the range of 20-55° C., preferably within 30-45° C., e.g. around 35° C.

The feed rate of the composition to be distilled may vary between broad ranges, and should conform to the overall size of the short path distillation apparatus used.

Two types of short path distillation are available: single and dual stage distillation.

In a single stage distillation, the product is only once short path distilled.

In a dual stage distillation, the product of interest is twice short path distilled e.g. in the first stage the 'lower' boiling products are removed and the residue is subjected to a second stage where the product of interest ends up in the distillate. So, in the second stage the product of interest is freed from the 'higher' boiling products.

In the process according to the present invention, preferably single stage short path distillation is applied.

Preferred Specifications of the Plasticizer:

The plasticizer according to the invention, produced based on the abovementioned process, in a preferred embodiment, may be derived from soybean oil as raw material and after epoxidation is trans-esterified with iso-amyl alcohol. Hereupon, short path distillation is performed and the residue is selected.

The plasticizer obtained according to the above described process is characterized by the following specifications:
1. oxirane value ≥5.9% 0
2. sum of non-epoxidized esters ≤5.0%
3. colour ≤100 APHA
4. water ≤0.1
5. acidity ≤0.5 mg KOH/g The main components of the product are isoamyl monoepoxystearate (typically 18-23 area %), isoamyl diepoxystearate (typically 55-60 area %) and isoamyl triepoxystearate (typically 5-7.5 area %). (the area % refers to the % obtained by a Gas Chromatography analysis; this corresponds more or less to weight %.)

The palmitate fatty acid esters (C16), to the extent as comprised within the soybean oil, are mostly evaporated during the short path distillation step and are not retained in the residue.

The C18 (stearate) fraction, at least as such compounds are functionalized during the preceding epoxidation step, is nearly completely retained in the residue following short-path distillation. The saturated stearate fraction is distilled over and not retained in the residue.

If 2-ethylhexanol is used instead of isoamyl alcohol, specifications 2 to 5 remain unchanged and specification 1 is changed to ≥5.5% 0.

If isononanol is used instead of isoamyl alcohol, specifications 2 to 5 remain unchanged and specification 1 is changed to ≥5.3%0.

The non-epoxidized esters for isoamyl alcohol are isoamyl palmitate, isoamyl stearate, isoamyl eicosanoate and isoamyl docosanoate or the corresponding esters in case of 2-ethylhexanol or isononyl alcohol. The same applies for the nature of the main components.

A plasticizer comparable as to performance may be obtained by the above process, starting from a different raw material, namely a different vegetable oil rich in unsaturated fatty acid moieties, e.g. linseed oil, etc.

The use of a different vegetable oil as raw material can cause changes in the composition and in the oxirane value due to the nature of the oil itself. The relative amounts of main components will have changed according to the composition of the used vegetable oil.

In the present specification and the claims, all percentages (%) are by weight, unless indicated otherwise General: Preparation of the Test Samples The inventors tested the gelation speed and the permanence of the plasticizer composition according to the invention (DEP) as compared to various plasticizers that are used in the state of the art. The plasticizer composition according to the invention used in the examples is based on soybean oil and isoamyl alcohol with the following specifications: oxirane value 6.15% 0, sum of non-epoxidized esters 3.2%, colour 36 APHA, water 0.06% and acidity 0.16 mg KOH/g.

Comparative plasticizers according to the state of the art that were the subject of comparative tests are the following:
di-benzoate esters, hereinafter referred to as DB;
di-isonyl phthalate, hereinafter referred to as DINP;
di-octyl-terephtalate, hereinafter referred to as DOTP;
hydrogenated DINP (=di-isonyl-cyclohexane-1,2-dicarboxylate), hereinafter referred to as DINCH.

All of the above plasticizers were added to a microsuspension type of PVC marketed by Kem One Company, Le Quadrille 19, Rue Jacqueline Auriol, Lyon, France, in a rate of 50 or 75 phr, as the case may be. To such mixture a heat stabilizer was added at a rate of 3 phr.

The plastisols so obtained were then the subject of the test procedures set forth in the description that follows.

1) PVC Gelation Speed and Compatibility: Minimum Gelation Temperature

A usual way to assess the gelation speed and the compatibility of a plasticizer is to determine the "minimum gelation temperature" of a plastisol containing the plasticizer to be assessed. The determination of the minimum gelation temperature can be performed by means of a rheometer, where a drop of the plastisol is placed between two metal mobile plates that together form a cell wherein the plastisol has minimum contact with the ambient air.

The lower the "minimum gelation temperature" is, the faster the gelation speed and the higher the compatibility will be.

The inventors have tested such minimum gelation temperature of PVC plastisols plasticized with each of the above-mentioned state of the art plasticizers and with the plasticizer composition according to the invention.

All of the plasticizers were added to the plastisol at a rate of 50 phr.

The test device used is a PHYSICA rheometer.
Test conditions are:
plate-plate mobile 25
Oscillatory mode
Shear deformation=10%
Frequency=20 s-1
Linear temperature ramp from 20 to 190° C. within 20 minutes.
Assessment: once viscosity reaches 100 Pa-s, the temperature is measured.
The results are as follows:

TABLE 1.1

| Plasticizer | DB | DINP | DOTP | DINCH | DEP |
|---|---|---|---|---|---|
| Temp ° C | 70.4 | 93.7 | 108.7 | 122.9 | 80.9 |

From the above figures, it is clear that in terms of gelation speed and of compatibility, the plasticizer composition according to the invention outperforms all state-of-the-art plasticizers, with the exception of dibenzoate.

When the plasticizer according to the invention, or the plasticizers according to the state of the art were admixed to traditional plasticizers and plastisols were prepared on the basis hereof, results were obtained that are fully in line with the abovementioned results.

2) PVC Gelation Speed and Compatibility: Transparency

A different way to assess the gelation speed and the compatibility of a plasticizer, is to test the transparency of specimens plasticized with the plasticizer to be assessed.

If the specimens are coated (and not calendered or extruded), there is no mechanical shearing. Gelation occurs only under the effect of heat and compatibility between plasticizer and polymer. In usual PVC gelation conditions (here 2 mins in a Mathis Oven at 200° C.), the higher the "transparency figure obtained", the higher the gelation speed and the compatibility are.

In a Mathis oven, specimens are in direct contact with circulating air. In such conditions, which are representative for the industrial PVC processing conditions, volatility of a plasticizer can lead to plasticizer loss and indirectly disturb gelation and subsequently lower the transparency. This phenomenon does not occur while running the "minimum gelation temperature" test where the measuring cell prevents direct contact between air and plastisol.

To that end, the inventors have tested the transparency of PVC plastisol specimens plasticized with each of the above-mentioned state of the art plasticizers and with the DEP plasticizer composition according to the invention.

All of the plasticizers were added to the plastisol at a rate of 50 phr.

The results are as follows:

TABLE 2.1

| Plasticizer | DB | DINP | DOTP | DINCH | DEP |
|---|---|---|---|---|---|
| Transparency | 84.1 | 88.0 | 85.8 | 87.6 | 88.4 |

From the above table, it is clear that in terms of transparency, the plasticizer composition according to the invention (DEP) outperforms all state-of-the-art plasticizers.

Based on "minimum gelation temperature" test results, it was expected that DB would outperform. The DB performance outlines that excessive volatility partly reduces the effect of high compatibility and fast gelation of DB.

When the plasticizer according to the invention, or the plasticizers according to the state of the art were admixed to traditional plasticizers and plastisols were prepared on the basis hereof, results were obtained that are fully in line with the abovementioned results.

The results of such mixtures or blends of plasticizers are as follows:

TABLE 2.2

| Plasticizer | DOTP + DEP | DINCH + DEP | DOTP + DB | DINCH + DB |
|---|---|---|---|---|
| Transparency | 86.9 | 87.4 | 85.0 | 85.5 |

It is clear that the admixture of the plasticizer composition of the invention (DEP) to either DOTP or DINCH enhances the level of transparency of the plastisols in a more substantive way as compared to the admixture of DB to either DOTP or DINCH.

These differences can only be explained by the volatility of dibenzoates which causes plasticizer loss during gelation of the plastisol in the oven.

In the above mixtures of plasticizers, the plasticizer composition of the invention (DEP) was admixed to either DOTP or DINCH in a relative weight ratio of 1/2.

3) PVC Gelation: Elongation at Break and Tensile Modulus

In a different series of tests, the strength at break, the tensile modulus and the elongation at break of the plasticizers according to the invention (DEP) were compared as to usual plasticizers known in the art.

For plasticizers incorporated at a ratio of 50 phr with respect to the resin, the results are set forth in the following table 3.1:

TABLE 3.1

| Plasticizer | DB | DINP | DOTP | DINCH | DEP |
|---|---|---|---|---|---|
| Strength at break (N/mm2) | 21.6 | 19.8 | 20.6 | 19.2 | 18.2 |
| Tensile modulus 100% | 9.7 | 9.5 | 10.4 | 10.2 | 7.2 |
| Elongation at break (%) | 255 | 300 | 298 | 291 | 320 |

For plasticizers incorporated at a ratio of 75 phr with respect to the resin, the results are set forth in the following table 3.2:

TABLE 3.2

| Plasticizer | DB | DINP | DOTP | DINCH | DEP |
|---|---|---|---|---|---|
| Strength at break (N/mm2) | 14.2 | 12.1 | 14.0 | 14.2 | 12.1 |
| Tensile modulus 100% | 5.1 | 4.9 | 5.8 | 5.7 | 4.0 |
| Elongation at break (%) | 310 | 327 | 325 | 348 | 385 |

The higher the compatibility between plasticizer and polymer is, the higher the gelation speed is. As a consequence, in specific gelation conditions (here 2 mins in a Mathis Oven), the higher the compatibility is, the higher the elongation at break and the lower the tensile modulus are.

In both cases, as well when incorporated at a rate of 50 phr and at 75 phr with respect to the resin, the plasticizer according to the invention outperforms all state of the art plasticizers as well in terms of tensile modulus as in terms of elongation at break.

4) Effect of High Permanence of DEP on Migration and Volatility

According to the state of the art, there are different procedures that enable a person skilled in the art to assess the sensitivity of a plasticizer to migration and to volatility. One of the most commonly used of such procedures or test protocols comprises ageing PVC specimens in an oven at 70° C. for 1 week. At such temperature, which is situated above the glass transition temperature of soft PVC, the plasticizer molecules are mobile and hence tend to migrate to the surface of the tested specimen and then due to overconcentration of plasticizer at the specimen surface, volatilization occurs.

The rate of weight loss measured of the specimen is a combination of the rate of migration (being the plasticizer flowing to the surface of the specimen) and the rate of volatilization (the plasticizer being released from the PVC specimen to the air).

The tables 4.1 through 4.3 shown below illustrate the results of the plasticizer composition according to the invention, as compared to various state-of-the-art plasticizers, considered to perform as "fast-fusers".

These tests have been performed with the plasticizer according to the invention being contained in the plastic to be plasticized in a weight ratio of 50 and 75 phr.

In all of these tests, the resin plasticized is PVC.

This means that to 100 parts by weight of the halogenated resin, e.g. PVC, 50, resp. 75 parts by weight of the plasticizer has been added.

On top hereof various other common ingredients may be added such as e.g. (a) stabilizer(s).

The tables 4.1 and 4.2 illustrate the effects when the plasticizers are used in isolation with respect to PVC, this means not being blended with another plasticizer.

The table 4.3 illustrates the effects when plasticizers are used in combination with another plasticizer.

The tables 4.1 and 4.3 illustrate the effects when the plasticizer composition has been added in an amount of 50 phr with respect to the PVC.

The table 4.2 illustrates the effects when the plasticizer composition has been added in an amount of 75 phr with respect to the PVC.

In all of these tables, for each specimen the weight loss after 1 hour, 4 hours, 24 hours and one week is illustrated by four consecutive columns.

Weight loss is indicated as a percentage of weight.

TABLE 4.1

| Plasticizer | DB | DINP | DOTP | DINCH | DEP |
|---|---|---|---|---|---|
| After 1 h | −0.25 | −0.25 | −0.20 | −0.27 | −0.19 |
| After 4 h | −0.44 | −0.35 | −0.29 | −0.40 | −0.22 |
| After 24 h | −2.56 | −0.88 | −0.82 | −0.81 | −0.05 |
| After 1 week | −6.50 | −0.41 | −1.13 | −0.90 | 0.85 |

Table 4.1 shows for DB, DINP, DOTP and DINCH a gradual increase in weight loss over time.

DINP, DOTP and DINCH all deliver high weight losses.

The DB (dibenzoate esters blend) even deliver extremely negative results.

For all of these samples, the weight loss becomes very significant after 24 hrs.

Contrary hereto, the weight loss for the plasticizer according to the invention, DEP, is close to zero, and even positive after one week (weight gain). The weight gain is due to the fact that all samples are contained in one and the same oven, implying that the plasticizer released by the other specimens is partly absorbed by the specimen plasticized with the plasticizer according to the invention.

Table 4.2 shows results which are in line with the results shown by Table 4.1.

TABLE 4.2

| Plasticizer | DB | DINP | DOTP | DINCH | DEP |
|---|---|---|---|---|---|
| After 1 h | −1.13 | −0.37 | −0.49 | −0.45 | −0.34 |
| After 4 h | −1.93 | −0.70 | −0.89 | −0.57 | −0.41 |
| After 24 h | −4.39 | −0.59 | −1.19 | −0.74 | 0.01 |
| After 1 week | −9.58 | −0.03 | −1.37 | −0.77 | 1.30 |

As is apparent from these figures, after one week, the cumulative weight loss of the state of the art samples may go up to values as high as −9.50% by weight of the plasticized composition.

The following table 4.3 illustrate the effect when the compound according to the invention, DEP, has been mixed with a state of the art plasticizer.

TABLE 4.3

| Plasticizer | DOTP + DEP | DINCH + DEP | DOTP + DEP | DINCH + DEP |
|---|---|---|---|---|
| After 1 h | −0.26 | −0.26 | −0.05 | −0.02 |
| After 4 h | −0.32 | −0.30 | −0.40 | −0.40 |
| After 24 h | −0.55 | −0.42 | −0.42 | −0.38 |
| After 1 week | −0.38 | −0.38 | −0.46 | −0.22 |

In the first two plasticizer compounds of this table 4.3 the relative weight ratio of DOTP over DEP, resp. DINCH over DEP amounted to 2/1.

In the last two plasticizer compounds of this table 4.3 the relative weight ratio of DOTP over DEP, resp. DINCH over DEP amounted to 1/2.

The results of this table illustrate two elements:
1) the overall beneficial effect of admixing the plasticizer of the invention, DEP, to a plasticizer composition comprising a traditional plasticizer such as DOTP or DINCH;
2) that such overall beneficial effect is more pronounced when the weight ratio of the plasticizer according to the invention over the traditional plasticizer is higher: the values of the last two columns are mostly lower compared to the values of the corresponding first two columns: in the last two columns DEP has been used in a weight ratio of 2/1 over the traditional plasticizer, whereas in the first two columns such weight ratio is 1/2, so a minor amount of the plasticizer according to the invention, DEP, has been used in the overall plasticizer composition.

Table 4.3 illustrate that formulations based on a mix of plasticizers, namely the plasticizer according to the invention along with a phthalate-free general-purpose plasticizer deliver results that remain in line with the conclusions one may draw from tables 4.1 and 4.2.

Impact of Weight Loss on Mechanical Properties:

We now will assess the impact of such weight loss on the mechanical properties of the sample. The plasticized composition basically comprises the resin to be plasticized, in this case PVC, and the plasticizer. Apart from these compounds, some other ingredients may be present, such as a stabilizer, but the weight proportion of such compounds is substantially lower in the overall plasticized resin composition.

Further, the base PVC material is not subject to evaporation during the test; this implies that most—if not all—of the weight losses are due to plasticizer and stabilizer. Hence we need to allocate the weight loss observed for a given sample to the relative amounts of (plasticizer+stabilizer) to get the ratio of released plasticizer and released stabilizer.

In case of a 50 phr of the plasticizer and 3 phr of the stabilizer formulation, the amount of plasticizer and stabilizer in the overall composition amount to 34%. (50+3/100+50+3).

This implies that in such a case, a 6.50% weight loss of the sample as mentioned in table 4.1 above for the DB compound after one week, represents a loss of plasticizer and stabilizer of 20%.

Since the stabilizer in general represents only 3% by weight of the formulation, even under the working assumption that all stabilizers would be lost during the test, even then the loss of plasticizer would still amount to 17%.

It is crystal clear that such plasticizer loss greatly impacts the mechanical properties of the sample.

This low permanence has been outlined while investigating transparency and mechanical properties just after gelation.

Effect of High Permanence Fast-Fusing Plasticizers on Plastisol Viscosity

The viscosity of the micro-suspension PVC plastisols containing the plasticizer according to the invention, added in a ratio of 50 phr, have been measured by the inventors after various maturation times at 23 and 35° C. Further the results have been compared with the results obtained when various state of the art plasticizers have been used, such as DINP, DB, DINCH and DOTP.

Isolated plasticizers and blend of plasticizers have been assessed. The blends were composed of DEP or DB mixed with DOTP or DINCH.

The viscosity was measured with various mobile rotation speeds (from 1 to 500 s$^{-1}$) and after several maturation times.

The results are shown in the FIGS. 1, 2, 3 and 4 attached hereto.

In these figures, the viscosity expressed in poises is shown in ordinate for the various samples, after 2, resp. 24, resp. 48 hours, and after 7 days and 1 month.

Figure 1:
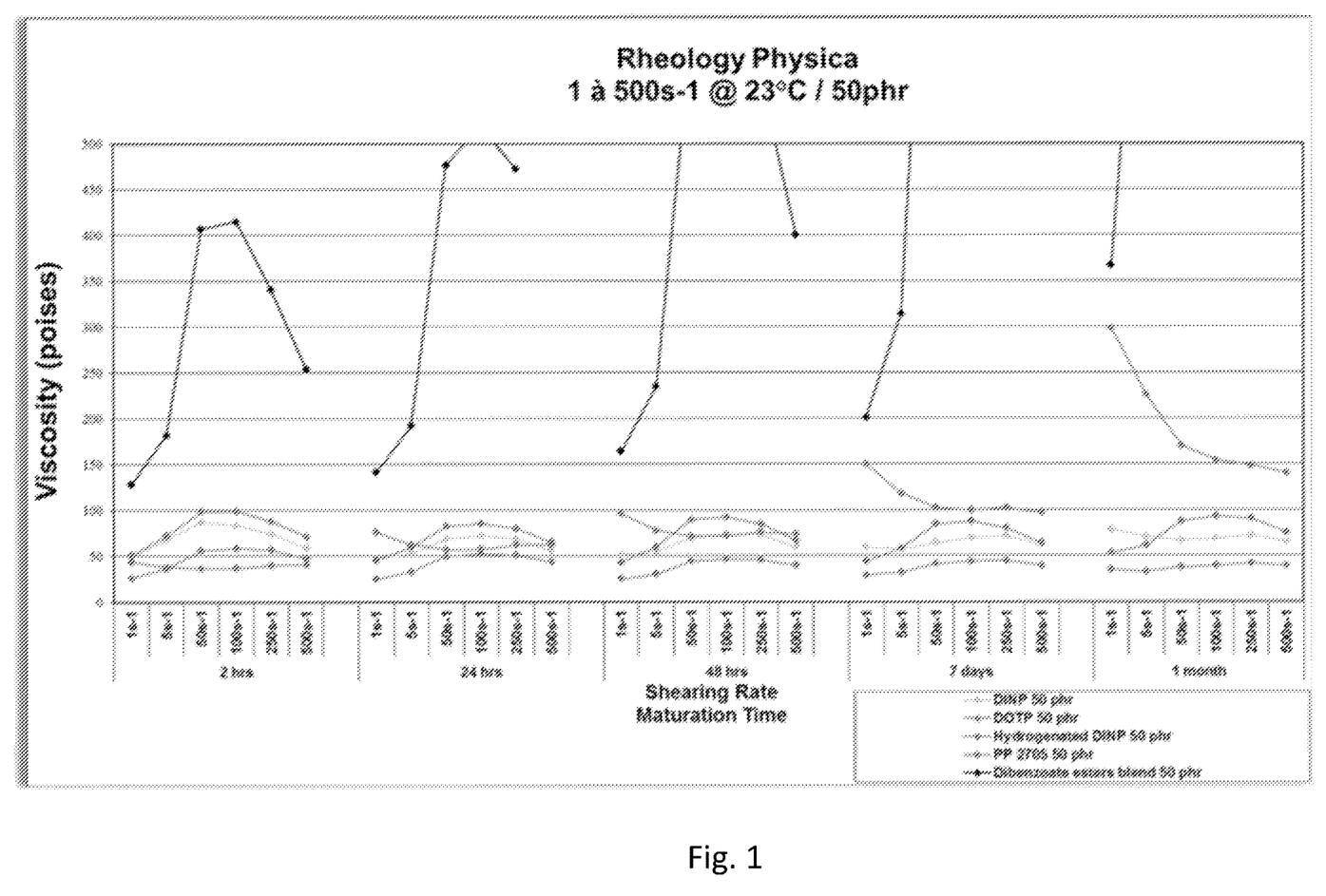
FIG. 1 is a plot of viscosity expressed in poises and is shown in ordinate for various samples, after 2, resp. 24, resp. 48 hours, and after 7 days and 1 month versus shearing rate, such viscosity is shown for values ranging from 1 à 500 s-1, at 23° C. and 50 phr.
Figure 2:
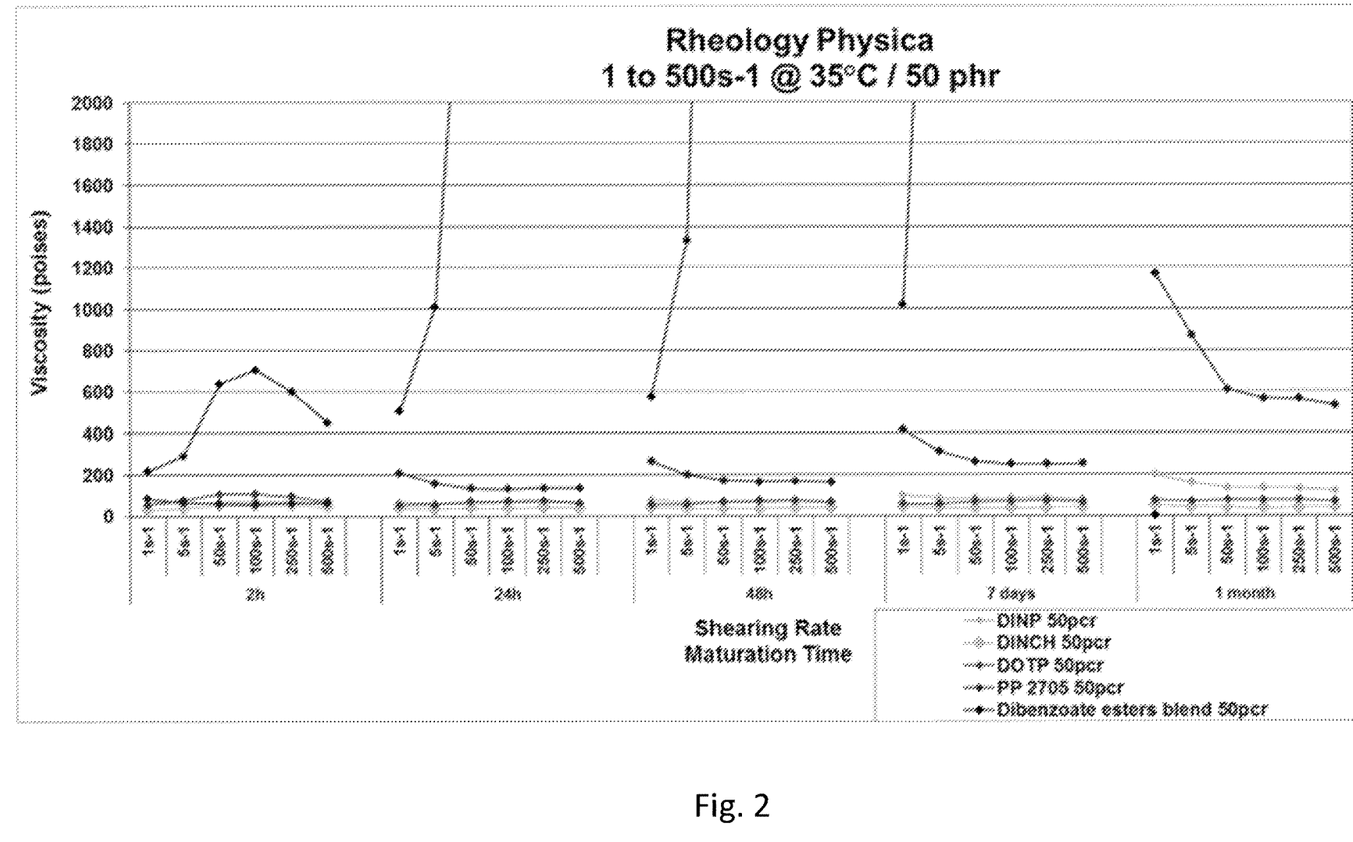
FIG. 2 is a plot of viscosity expressed in poises and is shown in ordinate for various samples, after 2, resp. 24, resp. 48 hours, and after 7 days and 1 month versus shearing rate, such viscosity is shown for values ranging from 1 à 500 s-1, at 35° C. and 50 phr.

In FIGS. 1 & 2, such viscosity is shown for values ranging from 1 à 500 s-1, at 23° C. and 50 phr.

Figure 3:
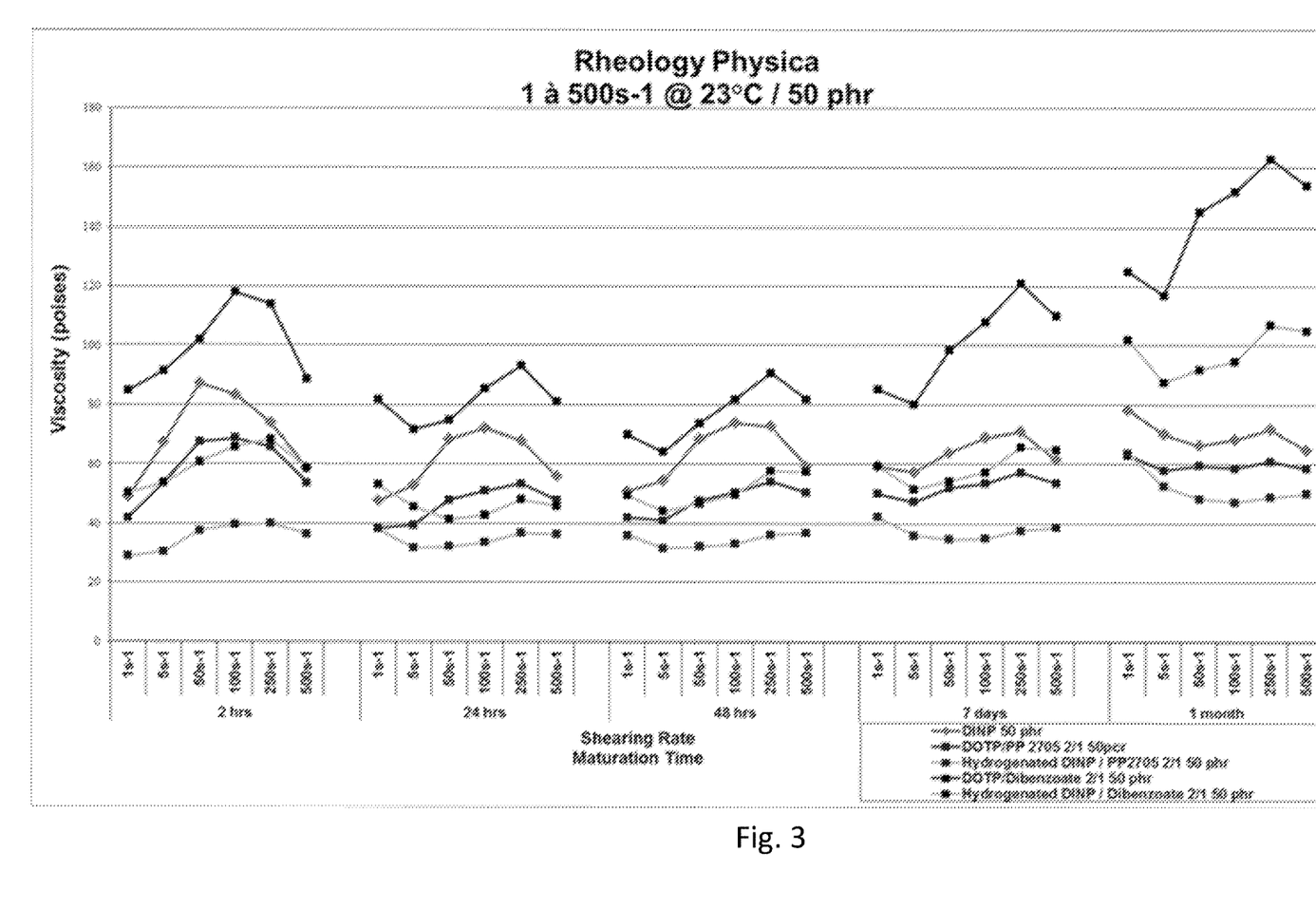
FIG. 3 is a plot of viscosity expressed in poises and is shown in ordinate for various samples, after 2, resp. 24, resp. 48 hours, and after 7 days and 1 month versus shearing rate, such viscosity is shown for values ranging from 1 à 500 s-1, at 23° C. and 50 phr.
Figure 4:
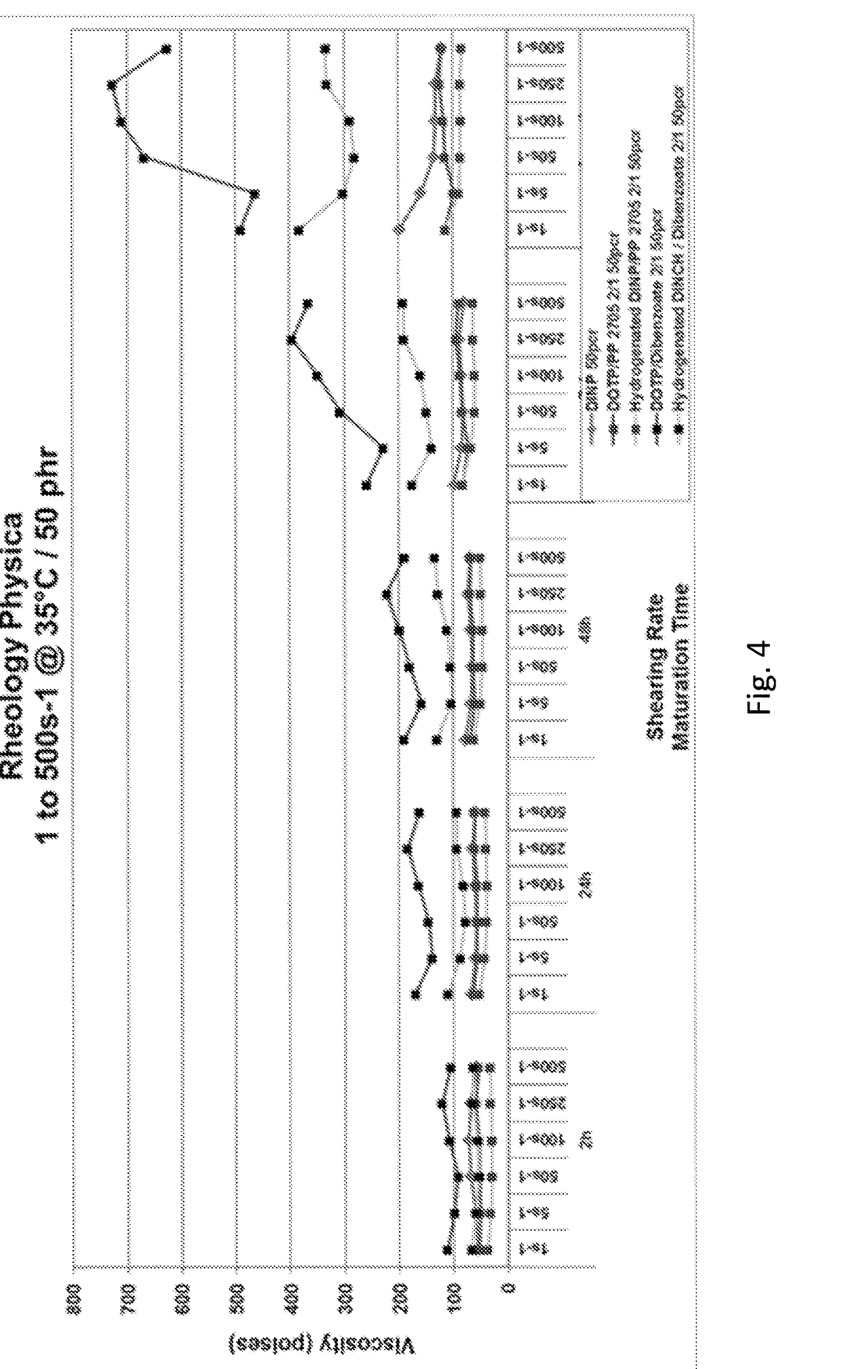
FIG. 4 is a plot of viscosity expressed in poises and is shown in ordinate for various samples, after 2, resp. 24, resp. 48 hours, and after 7 days and 1 month versus shearing rate, such viscosity is shown for values ranging from 1 à 500 s-1, at 35° C. and 50 phr.

In FIGS. 3 & 4, these measuring conditions are the same, except for the temperature which is 35° C.

From the results so obtained, it appeared that DB plasticizer renders the plasticized PVC plastisol quite unstable. This phenomenon excludes the use under practical circumstances of DB as a general-purpose plasticizer.

In clear contrast thereto, the plasticizer according to the invention yields a markedly more stable rheological profile compared to DB. This phenomenon enables the use of such plasticizer at any practical rate with respect to the resin to be plasticized (as well as "fast-fuser" or as general purpose plasticizer).

The inventors only noted that after a maturation period exceeding one month, the viscosity of a plastisol plasticized with the plasticizer according to the invention was too high to be suitable for plastisol coating. However, in nearly all practical applications, plastisols never are matured for a period exceeding one week. The one-month maturation time therefore has to be regarded as a crash-test, not suitable for use in practical industrial applications.

The results obtained with such tests also showed that a plastisol comprising a blend of a phthalate-free plasticizer and the plasticizer according to the invention yield an even lower and more stable rheological profile as compared to e.g. DINP. Plastisols containing a blend of phthalate-free plasticizers and DB are characterized by markedly unstable viscosity profiles and hence are not suitable for plastisol coating processes. This is one of the key drawbacks of the DB plasticizer: its incorporation rate into (PVC) resins usually must be kept at a lower level so as to avoid said issues to occur.

In clear contrast thereto, the plasticizers according to the invention are suitable for being incorporated at higher levels into the (PVC) resins, without rheological instability and/or gelation issues to occur at ambient temperatures.

GENERAL

In the claims as set forth hereinafter, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method of use of a depleted epoxidized fatty acid ester mixture, comprising:
    producing the depleted epoxidized fatty acid ester mixture by 1) epoxidation of a vegetable oil, followed by, 2) transesterification of the epoxidized vegetable oil, followed by, 3) distillation of the trans-esterified epoxidized vegetable oil at a pressure of less than 0.5 mbara, followed by 4) selection of the non-vaporized fraction of process step 3); and
    using the depleted epoxidized fatty acid ester mixture as a plasticizer in a halogenated resin composition.

2. The method of claim 1, wherein the weight amount of non-epoxidized esters in the depleted epoxidized fatty acid ester mixture is less than 5%.

3. The method of claim 1, wherein the weight proportion of the depleted epoxidized fatty acid ester mixture to the halogenated resin composition is equal to or above 40 phr.

4. The method of claim 3, wherein the weight proportion of the depleted epoxidized fatty acid ester mixture to the halogenated resin composition is equal to or above 50 phr.

5. The method of claim 1, wherein the depleted epoxidized fatty acid ester mixture is used together with another plasticizer selected from one or more of the following list:

di-benzoate ester, di-iso-nonyl phthalate ester, di-octyl-terephthalate ester, di-isononyl-cyclohexanoate ester.

6. The method of claim 1, wherein the oxirane value of the depleted epoxidized fatty acid ester mixture is greater than 5%.

7. The method of claim 1, wherein the vegetable oil comprises soybean oil and/or linseed oil.

8. The method of claim 7, wherein the oxirane value of the epoxidized soybean oil is greater than 6%, and the oxirane value of the epoxidized linseed oil is greater than 8%.

9. The method of claim 7, wherein the iodine value of the epoxidized soybean oil is below 5 g 12/100 g, and the iodine value of the epoxidized linseed oil is below 7 g 12/100 g.

10. The method of claim 1, wherein the pressure is less than 0.1 mbara.

11. The method of claim 1, wherein the halogenated resin includes having one or more polymers selected from the group consisting of polyvinylchloride, a copolymer of vinyl chloride with vinyl acetate and a copolymer of vinyl chloride with butyl acrylate.

* * * * *